Aug. 6, 1929.　　　A. PASCHER　　　1,723,884
CIRCUIT CONTROL SYSTEM
Filed March 17, 1926
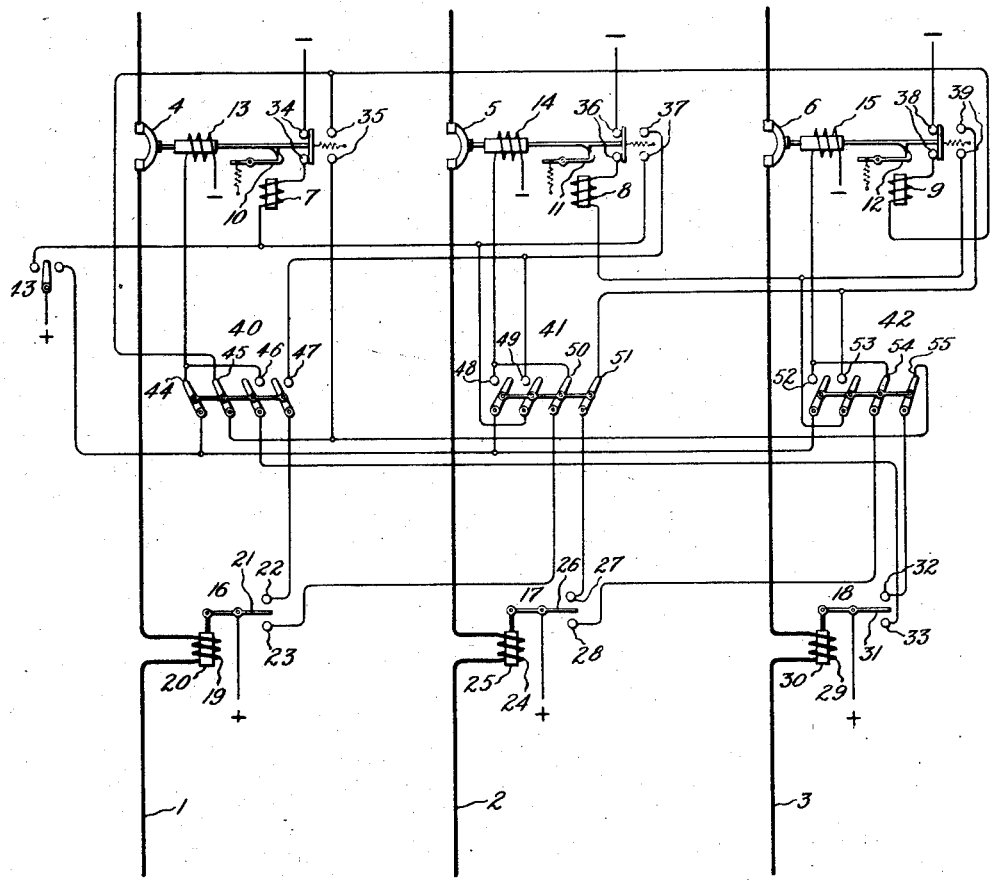
Inventor:
Adalbert Pascher,
by Alexander S. Lunt
His Attorney.

Patented Aug. 6, 1929.

1,723,884

UNITED STATES PATENT OFFICE.

ADALBERT PASCHER, OF NEUFINKENKRUG, GERMANY, ASSIGNOR TO GENERAL ELECTRIC COMPANY, A CORPORATION OF NEW YORK.

CIRCUIT-CONTROL SYSTEM.

Application filed March 17, 1926, Serial No. 95,461, and in Germany April 16, 1925.

My invention relates to improvements in circuit control systems and more particularly to circuit control systems for a plurality of electric conductors arranged to be controlled by a plurality of switches which are arranged to open and close in a predetermined sequence.

In German Letters Patent, No. 400,411 of August 21, 1924, there is described a system of connections for a plurality of distribution transformers interconnecting a supply circuit and a distribution circuit. One transformer referred to as the "leading" transformer is arranged to be connected to the system manually or automatically in accordance with an electrical condition of the system. Other transformers are arranged to be connected and disconnected automatically to and from the system in sequence depending upon the load demand on the distribution system. The closing coil of a switch for a transformer is connected in series with a contact of a relay which is controlled by the current of the transformer preceding in the sequence of closing, and the tripping coil of a switch for a transformer is connected in series with contacts of relays which are controlled by the current of the corresponding transformer, the current of the preceding transformer, or the total current of the system. The respective relays are adjusted to operate on different values of current in such a manner that on a decreasing load demand the transformers are disconnected in reverse sequence from the sequence of closing. By means of a "sequence" switch, any desired transformer may be used as the leading transformer. Where there are N transformers and any one particular transformer is chosen as the leading transformer, (N—1) releasing relays are required for each transformer unit.

An object of my invention is to provide an improved arrangement of apparatus and circuits for accomplishing the results obtained in the above-mentioned patent with a single releasing relay for each circuit, and in general to provide an improved arrangement of apparatus and circuits for switching means in any system comprising a plurality of conductors whose circuits it is desired to open and close in a predetermined sequence and in which any one circuit may be closed first with a predetermined sequence of closing and opening for the remaining circuits.

My invention will be better understood from the following description taken in connection with the accompanying drawing and its scope will be pointed out in the appended claims.

In the single figure of the accompanying drawing, I have illustrated diagrammatically an embodiment of my invention in a circuit control system comprising a plurality of electric conductors 1, 2 and 3, each of which may be arranged to be controlled by suitable electric switches or circuit interrupting means such as circuit breakers 4, 5 and 6, arranged so that the closing of one circuit breaker will be followed in a predetermined sequence by the remaining circuit breakers. The conductors 1, 2 and 3 may represent, for example, the circuits on the high or low tension side of distribution transformers, the circuits for automatic substations interconnected with a supply circuit and a distribution circuit, or the circuits for connecting and disconnecting a plurality of generators to and from a distribution circuit. It is, however, to be understood that my invention is not limited to any particular application, but may be used to advantage in any system comprising a plurality of conductors whose circuits it is desired to control in a predetermined sequence of closing and opening.

The circuit breakers 4, 5 and 6 may be provided with any of the well-known fault responsive means for controlling the circuits under abnormal conditions such as over current, under voltage, etc.; since in accordance with my invention the circuit breakers are free for any fault responsive control desired. For controlling and actuating the circuit breakers 4, 5 and 6 electrically, they may be provided with any suitable control means, such as opening coils 7, 8 and 9 respectively, arranged to effect the release of latching members 10, 11, and 12 respectively, and also with suitable actuating or closing means such as closing coils 13, 14 and 15 respectively. The opening coils 7, 8 and 9, and the closing coils 13, 14 and 15 may be energized from any suitable source of current such as the usual control bus, and connected thereto in accordance with the polarities indicated by negative and positive signs For the automatic connection and disconnection of each conductor, there are provided relays 16, 17 and 18 combining the functions of maximum and minimum relays which are energized by a current proportional to the current flowing in the conductor with which each relay is associated. Relay 16 comprises an operating coil 19 connected in series relation with conductor 1 and having in operative relation with it a core 20 connected to a lever 21 arranged to work between fixed contacts 22 and 23. Contact lever 21 is connected to the positive side of the control bus. Contact 22 is the minimum-contact point of relay 16 and is connected in the opening coil circuit of circuit breaker 4. Contact 23 is the maximum-contact point and is connected in the closing coil circuit of circuit breaker 5. In a similar manner, relay 17 comprises an operating coil 24 connected in series relation with conductor 2 and is provided with a plunger 25 and a contact lever 26 cooperating with fixed contacts 27 and 28, while relay 18 comprises an operating coil 29 connected in series relation with conductor 3 and is provided with a plunger 30 having contact lever 31 cooperating with fixed contacts 32 and 33.

Circuit breakers 4, 5 and 6 are provided respectively with auxiliary contacts 34, 36 and 38 which are arranged to be closed when the corresponding circuit breakers are closed, and auxiliary contacts 35, 37 and 39 which are arranged to be closed when the corresponding circuit breakers are open.

Conductors 1, 2 and 3 are provided respectively with sequence switches 40, 41 and 42, each of which has two different positions to enable any desired conductor to be made the leading circuit. In the position to the left, as shown with respect to switch 40, conductor 1 may be connected as the leading circuit by means of a remote control switch 43. In the position to the right, which is shown by the position of switches 41 and 42 associated with conductors 2 and 3 respectively, the completion of the closing coil circuits of circuit breakers 5 and 6 cannot be completed by switch 43, but the automatic connection and disconnection of the remaining conductors is made possible as will be described in more detail hereinafter. In a similar manner, if switch 41 or 42 is moved to the left and the remaining sequence switches are moved to the right, either conductor 2 or conductor 3 may be made the leading circuit. Switch 40 is provided with contacts 44, 45, 46 and 47, while switches 41 and 42 are provided with contacts 48, 49, 50 and 51, and 52, 53, 54 and 55 respectively. It will, of course, be understood that switches 40, 41 and 42 may be constructed in any desirable manner, and may take the form of a drum controller or any other convenient form. In any event, the particular type chosen must be constructed so that in the particular case illustrated for switch 40, contacts 46 and 47 are open when contacts 44 and 45 are closed.

If it is desired to close circuit breaker 4 and thus make it possible for conductor 1 to be the leading circuit, switch 40 is moved to the position shown in the drawing so as to close contacts 44 and 45. It is assumed that switches 41 and 42 will be in the position shown and that circuit breakers 4, 5 and 6 are in the open position, closing respectively auxiliary contacts 35, 37 and 39. Circuit 1 may be connected by moving switch 43 to the right. An energizing circuit for closing coil 13 is thereby completed from the positive side of the control circuit through contact 43, contacts 44 of switch 40, operating coil 13 of circuit breaker 4, to the negative side of the control circuit. Circuit breaker 4 now moves to its circuit closing position, closes its auxiliary contacts 34, and opens its auxiliary contacts 35. If the load carried by conductor 1 exceeds a predetermined amount, relay 16 moves contact lever 21 to engage contact 23. An energizing circuit for the closing coil 14 of circuit breaker 5 is completed from the positive side of the control bus, through contact 23, contact 50, closing coil 14, to the negative side of the control bus. Circuit breaker 5 moves to its circuit closing position, and at the same time closes its auxiliary contacts 36, and opens its auxiliary contacts 37. If the load carried by conductor 2 continues to increase, operating coil 24 of relay 17 is arranged to move contact lever 26 into engagement with contact 28 and thereby complete an energizing circuit for closing coil 15 of circuit breaker 6, from the positive side of the control bus, through contact 28, contact 54, closing coil 15, to the negative side of the control bus. Circuit breaker 6 is now closed, and at the same time closes its auxiliary contacts 38 and opens its auxiliary contacts 39.

If the load carried by the conductor 3 decreases below a predetermined value, relay 18 is arranged to move contact lever 31 into engagement with contact 32 and complete an energizing circuit for opening coil 9, from the positive side of the control bus, through contact 32, contact 55, contact 45, operating coil 9, contacts 38, to the other side of the control bus. Upon the energization of opening coil 9, latching member 12 is arranged to release circuit breaker 6, which moves to its open position. In the open position, circuit breaker 6 closes its auxiliary contacts 39 and completes a break in the circuit of opening coil 8 of circuit breaker 5. If the load continues to decrease, relay 17 is arranged to move contact lever 26 into engagement with contact 27 and complete an energizing circuit for opening coil 8 of circuit breaker 5, from the positive side of the control bus, through contact 27, contacts 39, coil 8, contacts 36, to the negative side of the control bus. Upon the energization of opening coil 8, latching member 11 is arranged to release circuit breaker 5 which moves to its open position.

If it is desired to disconnect conductor 1, switch 43 is moved to the left and completes an energizing circuit for opening coil 7 of circuit breaker 4 from the positive side of the control bus through coil 7, contacts 34 to the negative side of the control bus. Upon the energization of opening coil 7, latching member 10 is arranged to release circuit breaker 4 which moves to its open position and at the same time closes its auxiliary contacts 35.

It will be observed that circuit breaker 5 can be released only when circuit breaker 6 is in the open position, in view of the interlocking feature provided by contacts 39 of circuit breaker 6. In like manner, unless conductor 1 is the leading circuit, circuit breaker 4 can be released only when circuit breaker 5 has moved to the open position, in view of the interlocking feature provided by contacts 37 of circuit breaker 5. It will also be observed that when conductor 1 is the leading circuit, circuit breaker 4 cannot be opened by the operation of relay 16 since contact 47, in the circuit of the opening coil 7, is not engaged by sequence switch 40.

If it is desired to make conductor 2 the fundamental load circuit, its sequence switch 41 will be moved to the left, sequence switch 40 of conductor 1 will be moved to the right, and sequence switch 42 will be left in the position previously taken, that is, to the right. Switch 43 is moved to the right and completes an energizing circuit for closing coil 14 of the circuit breaker 5 from the positive side of the control bus, through contact 48, operating coil 14, to the negative side of the control bus. Circuit breaker 5 is moved to its circuit closing position, where it closes its auxiliary contacts 36 in the circuit of its opening coil 8. If the load carried by conductor 2 exceeds a predetermined value, relay 17 is arranged to close contacts 28 so as to complete a circuit for closing coil 15 of circuit breaker 6. Circuit breaker 6 now moves to its circuit closing position and at the same time closes its auxiliary contacts 38 in the circuit of its opening coil 9. If the load carried by conductor 3 continues to increase, relay 18 is arranged to close its contacts 33 and complete and energizing circuit for closing coil 13 of circuit breaker 4, from the positive side of the control bus through contact 33, contact 46, coil 13, to the negative side of the control bus. Circuit breaker 4 now moves to its circuit closing position and at the same time closes its auxiliary contacts 34 in the circuit of its opening coil 7.

With a decreasing load demand, relay 16 is arranged to close contact 22, which completes an energizing circuit for opening coil 7 of circuit breaker 4 from the positive side of the control bus through contact 22, contact 47, contact 49, coil 7, contacts 34, to the negative side of the control bus. With a continued decreasing load, relay 18 is arranged to close contacts 32 to complete an energizing circuit for opening coil 9 of circuit breaker 6 from the positive side of the control bus through contact 32, contact 55, contacts 35, coil 9, contacts 38 to the negative side of the control bus.

Conductor 3 may be made the fundamental circuit by moving sequence switch 42 to the left so as to close contacts 52 and 53. Switches 40 and 41 are then moved to the right so as to close contacts 46 and 47, and 50 and 51 respectively. Under these conditions, the sequence of operations for connecting and disconnecting the circuit breakers in the order 6, 4 and 5, will be obvious from the description given hereinbefore.

While I have shown and described but one embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A circuit control system comprising a plurality of switches, means for changing the sequence of operation of said switches, a plurality of control devices arranged one for each switch for controlling the successive closing and opening of said switches, a plurality of opening circuits arranged one for each switch, and a plurality of auxiliary switches arranged one for each switch and each in operative relation with a switch succeeding in the sequence of closing and cooperating with a control device associated with a switch preceding in the sequence of closing for controlling the opening circuit of the said preceding switch.

2. A circuit control system comprising a plurality of switches, selective switching means for predetermining the switch to be closed initially in closing said switches in sequence, a plurality of control devices cooperating with said selective switching means for controlling the successive closing and opening of said switches in a predetermined sequence, a plurality of opening circuits arranged one for each switch, and an auxiliary switch in the opening circuit of a switch preceding in the sequence of closing controlled by a switch succeeding in the sequence of closing whereby said preceding switch cannot be opened until said succeeding switch has been opened.

3. A circuit control system comprising a plurality of switches, selective switching means for predetermining the initial switch in the sequence of closing, a plurality of control devices cooperating with said selective switching means for controlling the successive closing and opening of said switches, a plurality of opening circuits arranged one for each switch, an auxiliary switch in an opening circuit of a switch preceding in the sequence of closing controlled by a switch succeeding in the sequence of closing for determining the order of opening of said switches, and contacts on said selective switching means arranged to provide a circuit around an auxiliary switch of the initial switch in the sequence of closing whereby the last succeeding switch may be opened irrespectively of the selection of the initial switch.

4. A circuit control system comprising a plurality of electric conductors, a plurality of switches arranged one in each of said conductors and adapted to be operated to control the circuits thereof, switching means for selecting the order of closing of said switches, a plurality of relays arranged one for each conductor and connected to be responsive to an electrical characteristic of the load carried by the conductor with which it is associated for controlling the successive closing of said switches when said selective switching means is in a predetermined position, and means in operative relation with a switch succeeding in the sequence of closing cooperating with a relay of a switch preceding in the sequence of closing for effecting the successive opening of said switches in the reverse sequence from closing.

5. A circuit control system comprising a plurality of electric conductors, a plurality of switches arranged one in each of said conductors, electro-magnetic mechanism in operative relation with each switch having closing and opening windings adapted when energized to close and open the same, switching means for selecting the circuit to be closed initially in the sequence of closing, a plurality of relays arranged one for each conductor and adapted to control the energization of the closing winding of the switch succeeding in the sequence of closing and the opening winding of the switch in the conductor with which it is associated, and means in operative relation with a switch succeeding in the sequence of closing cooperating with a relay of a switch preceding in the sequence of closing for effecting the successive opening of said switches in the reverse sequence from closing.

6. A circuit control system comprising a plurality of electric conductors, a plurality of switches arranged one in each of said conductors, an electro-magnetic mechanism in operative relation with each switch having closing and opening windings adapted when energized to open and close the same, selective switching means for permitting any desired circuit to be closed first, a plurality of relays one for each conductor and connected to be responsive to the current of its respective conductor for effecting the successive closing of said switches with a predetermined position of said selective switching means, and auxiliary switches in operative relation with a switch succeeding in the sequence of closing cooperating with a relay of a switch preceding in the sequence of closing for predetermining the order of opening of said switches.

7. A circuit control system comprising a plurality of electric conductors, a plurality of switches arranged one in each of said conductors and adapted to be operated to control the circuits thereof, a plurality of selective switching means arranged one with each switch for permitting any desired switch to be closed first, means comprising a closing coil arranged one with each of said switches for effecting the closing of said switches when said selective switching means are in a predetermined position, means comprising an opening coil arranged one with each of said switches for effecting the opening thereof, and an interlocking circuit controlled by a switch succeeding in the sequence of closing for controlling the opening coil circuit of a switch preceding in the sequence of closing.

8. A circuit control system comprising a plurality of electric conductors, a plurality of switches arranged one in each of said conductors and adapted to be operated to control the circuits thereof, an electro-magnetic mechanism in operative relation with each switch having opening and closing coils adapted when energized to open and close the same, selective switching means for permitting any desired switch to be closed first, a plurality of relays arranged one with each of said conductors and cooperating with said selective switching means for effecting the completion of a circuit for each of said closing coils in succession, and auxiliary contacts in operative relation with each switch arranged to be closed when its corresponding switch is open and cooperating with a relay of a switch preceding in the sequence of closing and the selective switching means of the switch with which said relay is associated for controlling the completion of the opening coil circuit of said preceding switch.

9. A circuit control system comprising a plurality of electric conductors, a plurality of switches arranged one in each of said conductors and adapted to be operated to control the circuits thereof, an electro-magnetic mechanism in operative relation with each switch having opening and closing coils adapted when energized to open and close the same, selective switching means for permitting any desired switch to be closed first, a plurality of relays arranged one for each of said conductors and provided with maximum and minimum contact points, said relay of a switch preceding in the sequence of closing when in the maximum-contact position cooperating with a selective switching means of a switch succeeding in the sequence of closing for completing the closing coil circuit of said succeeding switch, and auxiliary contacts in operative relation with each switch arranged to be closed when its corresponding switch is open and cooperating with a relay of a switch preceding in the sequence of closing when in its minimum-contact position and the selective switching means of a switch with which said relay is associated for controlling the completion of the opening coil circuit of said preceding switch.

In witness whereof, I have hereunto set my hand this 1st day of March, 1926.

ADALBERT PASCHER.